Sept. 26, 1967         D. J. BURKE         3,343,803
BALL VALVE WITH IMPROVED RESILIENT CLOSING MEANS
Filed June 6, 1966
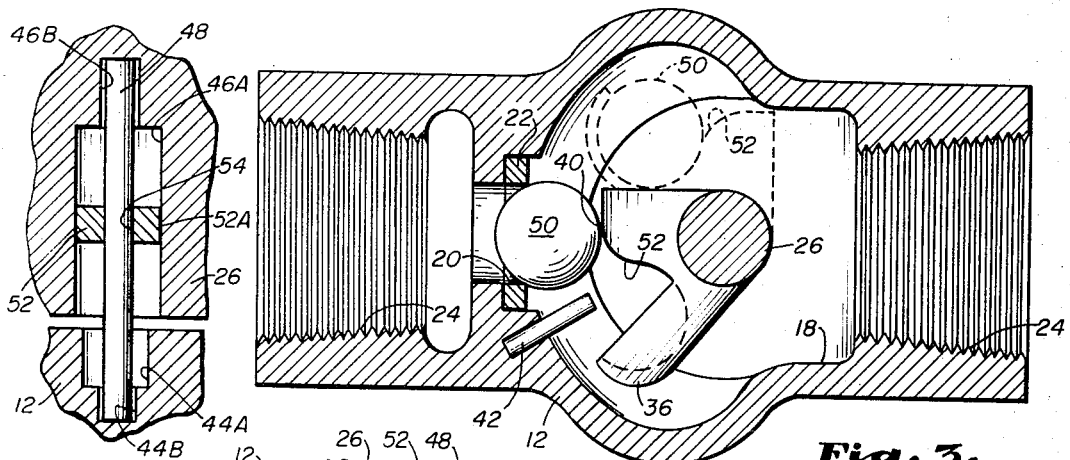
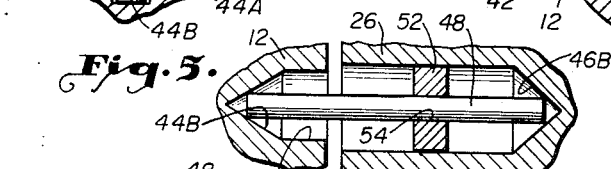
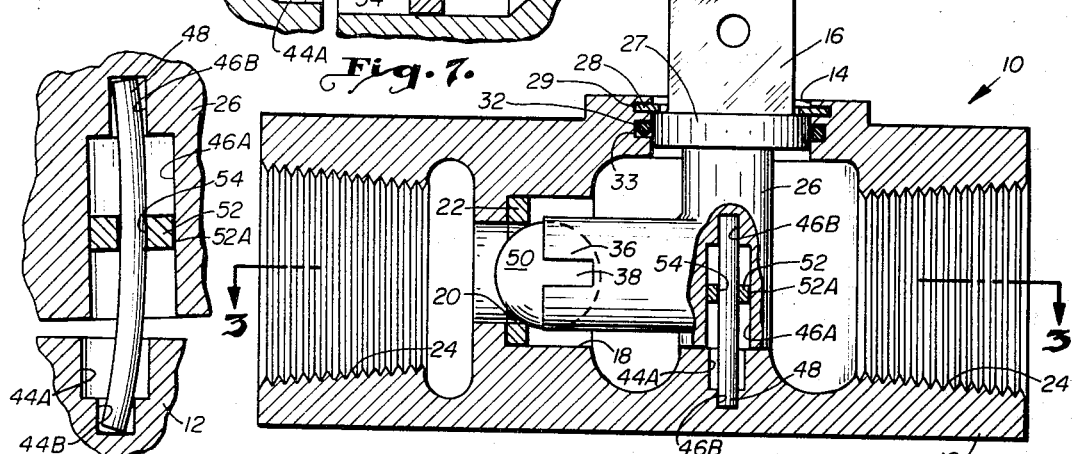
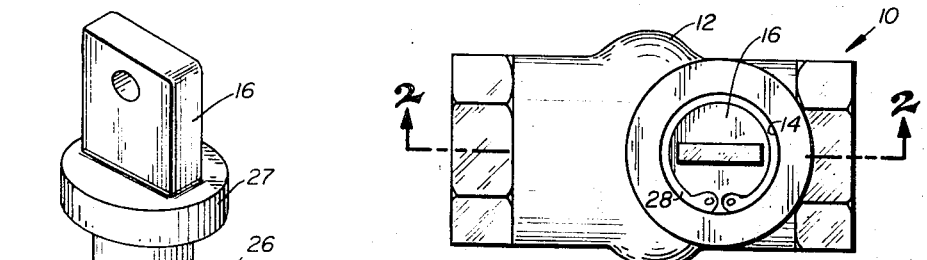
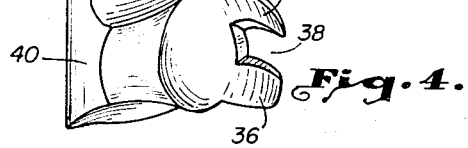
INVENTOR.
DONALD J. BURKE
BY
ATTORNEYS United States Patent Office 3,343,803
Patented Sept. 26, 1967

3,343,803
BALL VALVE WITH IMPROVED RESILIENT
CLOSING MEANS
Donald J. Burke, Tulsa, Okla., assignor to Continental Industries, Inc., Tulsa, Okla., a corporation of Oklahoma
Filed June 6, 1966, Ser. No. 555,344
5 Claims. (Cl. 251—176)

This invention relates to a valve. More particularly, this invention relates to a ball type shut-off valve having improved means of resiliently forcing a ball against a seat to insure more effective closure and extended service life.

In copending application S.N. 410,064, filed Nov. 10, 1964, by Donald J. Burke, et al., entitled Ball Type Shut Off Valve, there is disclosed a ball type shut off valve, one feature of which is the provision of a deflectable hinge pin. This invention is principally directed to a valve of the type as shown in the aforementioned application having improved means of resiliently urging the valve ball into sealed engagement with the valve seat.

It is, therefore, an object of this invention to provide a valve having all the features and advantages enumerated in the aforementioned application and including improved means of resiliently urging the valve ball into sealed engagement with the valve seat when the valve is in closed position.

Most particularly, it is an object of this invention to provide a valve having all of the features and advantages of the aforementioned application and including an improved deflectable pivot pin arrangement.

These objects and other more specific objects of the invention will be set forth and a better understanding of the invention will be had by referring to the following description and claims taken in conjunction with the attached drawings in which:

FIGURE 1 is an external view of an embodiment of the valve of this invention.

FIGURE 2 is an enlarged cross-sectional view taken along the line 2—2 of FIGURE 1.

FIGURE 3 is a cross-sectional view to the same scale of FIGURE 2 and taken along the line 3—3 of FIGURE 2.

FIGURE 4 is an isometric view of the actuating arm element of the invention.

FIGURE 5 is an enlarged sectional view of the pivot pin supporting the actuating arm to the housing as the pivot pin appears when the valve is in open position.

FIGURE 6 is a segmented cross-sectional view as shown in FIGURE 5 but showing the configuration of the pivot pin as it is deflected during closure of the valve to resiliently urge the ball into seating position.

FIGURE 7 is a segmented cross-sectional view as shown in FIGURES 5 and 6 showing an alternate arrangement when the pivot pin is retained in tapered recesses.

Referring now to the drawings and first to FIGURE 1, the valve of this invention is indicated generally by the numeral 10. The external parts of the valve include a body 12, an actuating arm opening 14 and the externally extending shaft portion 16 of an actuating arm.

Referring to FIGURES 2 and 3, the internal mechanisms and the overall construction of the valve is best shown. The valve body 12 is provided with a flow passageway 18 therethrough. A part of the flow passageway is defined by valve seat 20 which may be formed as an integral part of the valve body 12 or, preferably, by an insert 22. The valve body may include, as shown, threads 24 at each end by means of which the valve is connected to piping. Pivotally mounted within the flow passageway 18 is an actuating arm 26 pivotally supported by the externally extending shaft portion 16. The actuating arm opening 14 receives an enlarged cylindrical shaft sealing portion 27. An expanding retainer washer 28 received in groove 29 retains the actuating arm 26 within the valve body. An O-ring gasket 32 positioned in a groove 33 in body opening 14 seals the shaft sealing portion 17 to prevent escape of gas or fluid.

The external end of the shaft portion 16 is flattened to receive a wrench whereby the actuating arm 26 may be pivoted.

Although not shown in the drawings, the body portion 12 may include a threaded boss portion to receive an internally threaded cap to completely and sealably cover the externally extending portion of shaft 16 so that, with such a cap in place, failure of gasket 32 will not permit any leakage of gas or fluid externally of the valve.

Actuating arm 26, as best shown in FIGURE 4, is defined in part by two substantially parallel spaced fingers 36, the fingers 36 providing a notch or space 38 therebetween. In addition, the actuating arm 26 is further defined by a cam surface 40 positioned adjacent the fingers 36.

As best shown in FIGURE 3, a ball retaining pin 42 is affixed to the interior of the valve body 12 and extends within the flow passageway 18 adjacent the valve seat 20. The function of the ball retaining pin 42 will be described subsequently.

Formed in the interior of body 12 and in axial alignment with actuating arm opening 14 is a pivot pin recess (see FIGURE 2) which consists, in the preferred embodiment, as shown, of a first larger diameter opening 44A terminating in a smaller diameter portion 44B. Similarly, formed in the end of the actuating arm 26 opposite the shaft portion 16 is a pivot pin recess which consists, in the preferred embodiment, of a first larger diameter portion 46A and a smaller diameter portion 46B. Rotatably positioned in the pivot pin recesses 44B and 46B is a pivot pin 48.

Positioned within the low passageway 18 of the body 12 is a ball 50. In the opened position of the valve the ball 50 is loosely detained between the valve body and the actuating arm and is free to rotate. The ball 50 is moved by the actuating arm 26 and is controlled in its position by the actuating arm fingers 36 and the opposing inclined surface 52 of the actuating arm 26.

An important feature of the valve of this invention is the provision of a pivot pin deflector collar 52, best shown in FIGURES 2, 5 and 6. The pivot pin deflector collar is cylindrical, the external cylindrical surface 52A being press fitted within the larger diameter portion 46A in the pivot pin recess. The pivot pin deflector collar 52 has an axial opening 54 therethrough which closely receives the pivot pin 48. In the preferred arrangement, the pivot pin deflector collar 52 is of relatively short axial length compared to the length of enlarged diameter portion 46A of the actuating arm pivot pin recess and is positioned substantially intermediate the length of the pivot pin recess. The function and importance of the pivot pin deflector collar 52 will be described subsequently.

Referring to FIGURE 3, the operation of the valve is best shown. To close the valve the actuating arm 26 is pivoted from the dotted to the illustrated position. As the actuating arm 26 is pivoted towards the closed position the inclined surface 52 moves the ball 50 with it until the area of the seating surface 20 is reached. The ball is prevented from continuing its travel with the actuating arm by ball retaining pin 25 which holds the ball in the vicinity of the seating surface 20. The ball 50 is then contacted by the cam surface 40 which forces it into firm sealed contact with seating surface 20.

The valve is opened by pivotation of the actuating arm 26 in the opposite direction. The total pivot arc required from total open to closed position is approximately 90° or less. As the actuating arm 26 is pivoted towards open position the cam surface 40 first releases pressure on the ball 50 and then fingers 36 pick up the ball and move it away from the valve seat surface 20 to permit fluid or gas flow through the valve.

An important characteristics of the valve of this invention is the provision of means whereby the ball 50 is resiliently retained in its position against its valve seat surface 20 so that manufacturing tolerances as well as wear of the valve seat surface 20, ball 50, and the cam surface 40 is compensated for. This method of resiliently restraining the ball 50 into closed position is illustrated best by referring to FIGURES 5 and 6 which show the function of the pivot pin. FIGURE 5 shows the pivot pin as it appears when the valve is in the open position and no force is applied against the cam surface of the actuating arm 26. Pin 48 supports the actuating arm 26 in alignment. The pin 48 is pivotally supported by the smaller diameter portions 44B and 46B of the pin receiving recesses.

As the actuating arm is moved to closed position the force of the cam surface against ball 50 deflects the actuating arm 26 as shown in FIGURE 6. This deflection within the elastic limits of pin 48 applies resilient closing force continually to the ball when in closed position. In addition, as wear occurs in any portions of the valve such wear is absorbed by the resiliency imparted by the deflected pin 48. The provision whereby the smaller diameter portions 44B and 46B of the pin receiving recesses are spaced from each other permits a much greater degree of deflectability of pin 48.

The provision of pin deflector collar 52 is important. As previously described, the deflector collar 52 is positioned intermediate the ends of the enlarged diameter pin receiving recess 46B in the actuating arm 26. Thus the deflector collar 52 is positioned intermediate the length of pivot pin 48. As the actuating arm 26 is deflected relative to body 12 by the action of the cam surface thereof against the ball a deformation bow is imparted within the elastic limits in the deflectable pivot pin 48. This deflection of the pivot pin 48 exerts a resilient force against the valve ball to maintain it in sealed engagement with the valve seat. The deflector collar causes the deformation of the pin to take place in a geometrical way substantially distributing the deformation throughout the pin length, thus permitting greater resiliency with decreased danger of permanent pin distortion.

FIGURE 7 shows the arrangement wherein the pin receiving recesses 44A and 46A terminate in tapered portions 44B and 46B. In this arrangement the pivot pin 48 is freely deflectable in a single bow when the valve is closed while the actuating arm 26 is held in exact alignment when the valve is in open position.

Although this invention has been described with a certain degree of particularity, it is manifest many changes may be made in the details of construction and arrangement of components without departing from the spirit and scope of this disclosure.

What is claimed is:

1. A valve comprising:

a body having a flow passageway therethrough, a shaft opening in one side thereof, and a pivot pin recess in said passageway coaxial with and opposite said shaft opening, a portion of the flow passageway being defined by a valve seat;

a ball in said passageway adaptable, when moved against said valve seat, to close the valve;

an actuating arm within said body passageway having an integral shaft portion sealably extending through said shaft opening, said shaft portion pivotally supporting said actuating arm whereby said arm may be pivoted by externally applied torque, the actuating arm having means to engage said ball to move said ball away from said valve seat when said arm is pivoted to the valve opening position and to move said ball towards said valve seat when said arm is pivoted to the valve closed position, the actuating arm being defined further by a cam portion adaptable to force said ball into sealed contact with said seat when said actuating arm is pivoted to the valve closed position, said actuating arm having an enlarged diameter pivot pin recess therein coaxial with and opposite said shaft portion, said enlarged diameter pivot pin recess terminating interiorly within a coaxial reduced diameter pin recess;

a deflectable pivot pin having one end received in said body pivot pin recess and the other end received in said interior reduced diameter pivot pin recess, said pivot pin pivotally supporting said actuating arm coaxially and in cooperation with said shaft portion; and a pivot pin deflector collar positioned in said actuating arm enlarged diameter pivot pin recess, said pivot pin deflector collar having an opening therein receiving said pivot pin.

2. A valve according to claim 1 wherein said pivot pin deflector collar is of relatively short axial length compared to said enlarged diameter pivot pin recess in said shaft portion and wherein said pivot pin deflector collar is positioned substantially intermediate the ends of said enlarged diameter pivot pin recess.

3. A valve according to claim 1 wherein said valve body pivot pin recess is defined by a larger diameter opening terminating in a coaxial reduced diameter pin receiving opening whereby said pivot pin is increasingly deflectable.

4. A valve according to claim 1 wherein said actuating arm is defined in part by substantially paralleled spaced fingers which engage and move said ball as said actuating arm is pivoted.

5. A valve according to claim 4 including a ball retaining pin affixed to the interior of said body adjacent said valve seat, the retaining pin extending between said fingers of said actuating arm as it is pivoted, said pin retaining said ball between said valve seat and said cam portion of said actuating arm as said actuating arm is pivoted to the closed position.

References Cited

UNITED STATES PATENTS

| | | | |
|---|---|---|---|
| 2,499,732 | 3/1950 | Diehl | 251—163 |
| 2,650,059 | 8/1953 | Hjulian | 137—449 X |
| 2,666,617 | 1/1954 | Paul | 137—271 |
| 2,750,960 | 6/1956 | Hansen | 251—158 X |
| 3,086,746 | 4/1963 | Holleron | 251—83 |

CLARENCE R. GORDON, *Primary Examiner.*